United States Patent [19]
Porter et al.

[11] Patent Number: 5,452,984
[45] Date of Patent: Sep. 26, 1995

[54] FILTER PLUG TRAY

[75] Inventors: Frederick Porter, Midlothian; Larry W. Shepherd, Glen Allen; Joseph J. Sprouse, Jr., Chester; Michael J. Steeves, Richmond, all of Va.

[73] Assignee: Philip Morris Incorporated, New York, N.Y.

[21] Appl. No.: 355,445

[22] Filed: Dec. 12, 1994

Related U.S. Application Data

[63] Continuation of Ser. No. 27,223, Mar. 5, 1993, abandoned.

[51] Int. Cl.⁶ ..................................... B65G 1/04
[52] U.S. Cl. ......................... 414/403; 53/148; 198/347.3; 414/327
[58] Field of Search ................... 414/403, 416, 414/327; 198/347.2, 347.3; 53/148, 236

[56] References Cited

U.S. PATENT DOCUMENTS

| | | | |
|---|---|---|---|
| 2,591,202 | 4/1952 | Ruau | 53/236 |
| 2,997,828 | 8/1961 | Ahlbor | 198/347.3 |
| 3,024,585 | 3/1962 | Schubert et al. | 53/148 |
| 3,305,128 | 2/1967 | Dearsley | 414/327 |
| 3,508,377 | 4/1970 | Banks | 53/236 |
| 3,509,986 | 5/1970 | Focke | 198/347.3 |
| 3,921,790 | 11/1975 | Hinchcliffe et al. | 414/403 |
| 3,950,920 | 4/1976 | Thomsen et al. | 53/236 |
| 3,985,252 | 10/1976 | Hinchcliffe et al. | 198/347.2 |
| 4,201,507 | 5/1980 | Hinchcliffe et al. | |
| 4,222,477 | 9/1980 | Molins et al. | 198/347.3 |
| 4,231,461 | 11/1980 | Hinchcliffe et al. | 198/347.3 |
| 4,338,057 | 7/1982 | Molins . | |
| 4,344,520 | 8/1982 | Czoch et al. | 198/347.2 |
| 4,368,742 | 1/1983 | Wahle et al. | 198/347.2 |
| 4,423,996 | 1/1984 | Applegate et al. . | |
| 4,507,040 | 3/1985 | Baese et al. . | |
| 4,580,939 | 4/1986 | Dyett et al. . | |
| 4,668,152 | 5/1987 | Gömann et al. . | |
| 4,744,453 | 5/1988 | Krause et al. | 198/347.2 |
| 4,915,572 | 4/1990 | Hinchcliffe et al. . | |
| 5,005,689 | 4/1991 | Maier et al. | 198/347.3 |
| 5,106,254 | 4/1992 | Tolasch et al. . | |

Primary Examiner—Michael S. Huppert
Assistant Examiner—Thomas J. Brahan
Attorney, Agent, or Firm—Kevin B. Osborne; James E. Schardt; Charles E. B. Glenn

[57] ABSTRACT

A filter plug tray includes a housing having a loading port which cooperates with external loading and unloading stations, a feed conveyor for conveying filter plugs across the loading port, and expandable filter plug constraining means positioned in the housing to contain the filter plugs in a desired orientation and alignment. The constraining means includes a flexible band wound under tension on a reel rotatably mounted the housing. The flexible band unwinds as plugs are loaded into the tray and winds onto the reel to urge plugs to the loading port as plugs are unloaded.

29 Claims, 3 Drawing Sheets

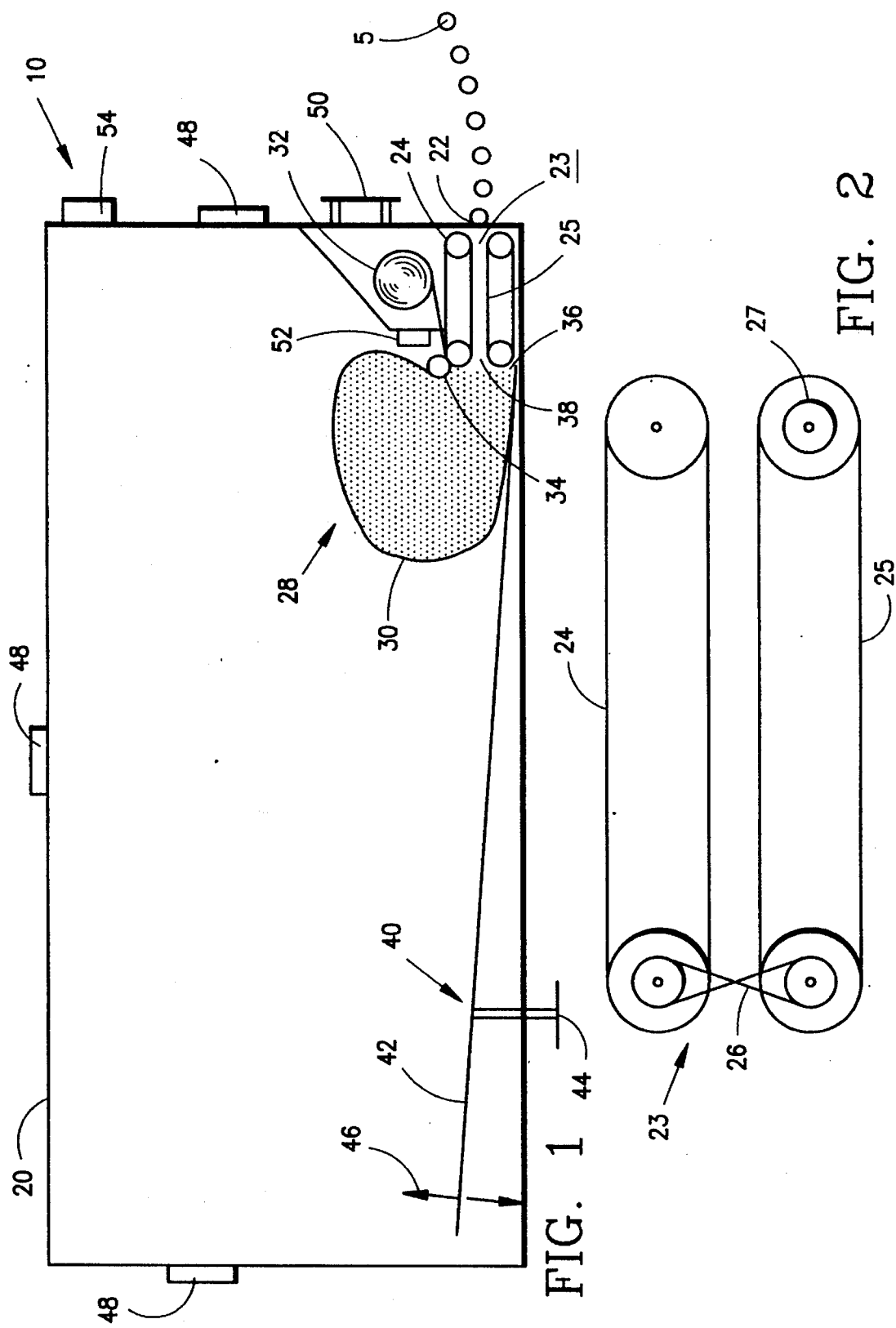

FILTER PLUG TRAY

This application is a continuation of Ser. No. 027,223 filed Mar. 5, 1993, now abandoned.

BACKGROUND OF THE INVENTION

1. Field of the Invention

The present invention relates to an apparatus for containing and permitting transport of rod-shaped articles such as cigarettes and cigarette filter plugs. More particularly, the present invention relates to an apparatus for receiving filter plugs from a plug maker, for containing the plugs in a desired alignment and orientation while the tray is moved to a curing station, and for unloading plugs at a station for further processing.

2. State of the Art

In the manufacture of cigarettes and similar filtered smoking products, filter plugs are manufactured separately from the tobacco rod and loaded into trays for storage until needed for attaching to cigarette bodies. Storage can also permit a filter plug inventory to be established. Temporary storage may be necessary because the filter plug manufacturing unit can produce plugs at a higher temporary rate than the cigarette manufacturing operation will use them. In addition, temporary storage is frequently necessary to allow the bonding agents used in the filter plugs to cure before the filter plug is incorporated into the cigarette.

Typically, the filter plug manufacturing station includes a loading station for loading newly manufactured filter plugs into the storage trays. The cigarette manufacturing station will correspondingly include an unloading station to receive cured filter plugs from the trays. The use of storage trays allows the filter plugs to be contained in conveniently sized batches and easily moved from the filter loading station to a storage area and later to the unloading station.

Various container arrangements for filter plugs, cigarettes, and other rod-shaped articles are known in the art. For example, U.S. Pat. No. 4,201,507 to Hinchcliffe et al. discloses a mobile reservoir with a serpentine-shaped storage path and a conveyor which moves cigarettes from an entrance at one end of the serpentine-shaped path to an exit at the other end. U.S. Pat. No. 4,423,996 to Applegate et al. discloses a trolley with several vertical compartments each having a movable captive platform. Cigarettes are loaded by a conveyor into the compartments from the top and the platform descends to accommodate the size of the load. U.S. Pat. No. 4,507,040 to Baese et al. discloses a machine for transporting cigarettes from a making machine to a packing machine which includes moveable trays to accept an overflow of cigarettes. The trays include a movable bottom wall which lowers as the tray is filled; the tray is turned upside down to unload the cigarettes.

A problem in the prior art relates to the industry practice of handling filter plugs and other rod-shaped articles in bulk. Difficulties arise because plugs at the leading edges of the bulk flow tend to rotate out of the correct lengthwise alignment and foul the feeding and conveying mechanisms. This problem often occurs at the leading edge of the flow of plugs because the plugs in this area are loose and unconstrained, for example, by other plugs, by the conveyor, or by the walls of the tray. In addition, movement of the trays may cause plugs to spill from the tray because of the lack of containment.

Crossed or fouled plugs interrupt the transfer of plugs into and out of the trays causing delays in the manufacturing process. Jams in the feeding mechanisms also require the attention of an operator who must be on hand to correct the problem.

Another problem in the prior art is that the movable trays, particularly the type described above, can be complicated machines with many moving parts that are often expensive to manufacture and maintain.

SUMMARY OF THE PRESENT INVENTION

The present invention, generally, overcomes the problems in the prior art by providing a tray apparatus that provides a means of applying pressure to band the filter plugs in a predetermined orientation in the tray.

Furthermore, the apparatus of the present invention provides a tray for containing and transporting filter plugs or rod-shaped articles that has few moving parts and is simple and inexpensive to construct and maintain.

More particularly, the present invention provides a filter plug tray including a housing having a feeding means for feeding filter plugs into the tray, and an expandable constraining means for receiving filter plugs in the tray and maintaining the plugs in a predetermined, aligned orientation to prevent movement of the plugs in the tray.

According to another aspect of the invention, the feeding means comprises a pair of spaced parallel conveyor belts to convey filter plugs in single layer into the tray from a loading station.

According to yet another aspect of the present invention the tray apparatus further includes a control interface which communicates with a control unit at a plug load or unload station.

Yet another aspect of the present invention comprises a jam sensing means for sensing a jam in the feed conveyor and communicating with the control interface to cease loading or unloading plugs.

The invention further includes a volume sensing means for sensing the volume of plugs in the tray and communicating with the control interface to control the loading or unloading operation.

BRIEF DESCRIPTION OF THE DRAWING FIGURES

The present invention can be further understood with reference to the following description in conjunction with the appended drawings, wherein like elements are provided with the same reference numerals. In the drawings:

FIG. 1 is a side elevational view of a filter plug tray of the present invention;

FIG. 2 is a side view of a feed conveyor apparatus;

DETAILED DESCRIPTION OF THE PREFERRED EMBODIMENTS

Figure 3:
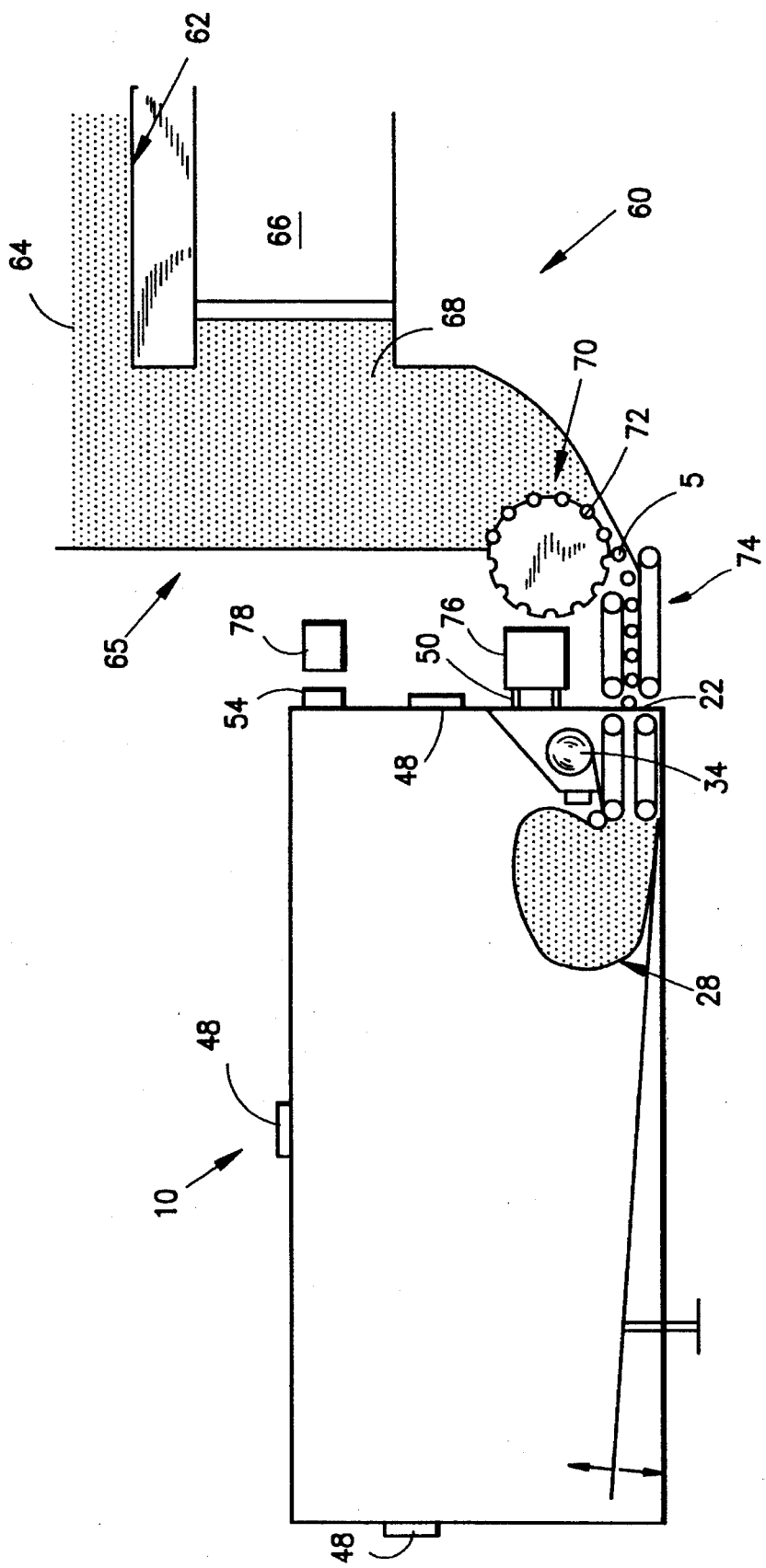
FIG. 3 is a side elevational view of the filter plug tray engaged at a plug loading station.

FIG. 1 is side elevational view of a filter plug tray 10 of the present invention. The tray 10 comprises a housing 20 which is adapted to be readily moved. The housing 20 may be provided with wheels (not shown) or may be transported by a conveyor system, for example, a conveyor belt, conveyor chain, or rails (not shown). During the cigarette manufacturing process the tray 10 may be moved from a filter plug loading station at a plug making unit, to a plug curing station to allow the newly made plugs to cure, and finally to a plug unloading station where the cured plugs are delivered to a cigarette making unit which assembles filters on cigarettes.

A loading port 22 is located at an end of the housing 20 for connection with a filter plug delivery and discharge means associated with the loading station and unloading station. A feeding means 23 is provided for moving filters from the delivery and discharge means across the loading port and to the interior of the housing 20. In a preferred embodiment of the present invention, the feeding means comprises a feed conveyor 23 disposed in the housing 20 immediately adjacent to the loading port 22. Alternatively, the feeding means 23 may comprise a chute or similar means that engages the plug delivery and discharge means associated with the loading and unloading stations.

The feed conveyor is shown in FIG. 2. The feed conveyor 23 comprises an upper feed belt 24 and a lower feed belt 25. The feed belts 24, 25 are arranged in a spaced parallel relationship to move filter plugs 5 in a single layer across the loading port 22 to and from the interior of the housing 20. The feed belts 24, 25 are connected by an endless transmission 26, such as a belt, rope or chain so that the feed belts may be driven at the same speed from a single source. In a preferred embodiment, a coupling 27 for connection with an external drive source is provided to drive the feed conveyor 23. The coupling 27 may be any conventional means, such as a gear, friction wheel, or similar device. Alternatively, a motor may be provided integral with the tray 10 to drive directly the conveyor 23.

An expandable constraining means 28 is provided to pack and hold plugs loaded into the housing 20 closely together in a bundle-like manner. The constraining means 28 expands to adjust the internal space of the housing 20 to match the volume of plugs in the housing as plugs are loaded into the tray 10 and contracts as plugs are discharged. The constraining means 28 applies pressure around the bundle of plugs to maintain the plugs in the same predetermined parallel alignment in which the plugs are loaded into the tray 10. Pressure on the plugs also helps to prevent movement of the plugs in the tray 10, such as crossing or turning out of orientation relative to the other filter plugs, or slipping or falling from the bundle. Furthermore, pressure on the filter plugs ensures that during the unloading step, described below, the filter plugs will be delivered to the feed conveyor 23 in correct orientation, and reduces the likelihood of jamming or fouling the feed conveyor.

In a preferred embodiment of the present invention, the constraining means 28 comprises a flexible band 30 wound on a take-up reel 32. The band 30 is formed of a thin, flexible material, for example, a fabric, rubberized fabric, or plastic material such as a polyester. A first end 36 of the band is fixed in the housing 20. A second end of the band 30 is wound on the reel 32, which is rotatably mounted in the housing 20. The reel 32 is under winding tension, such as a spring load, to bias it to roll up the band 30, and thus maintain pressure on the plug bundle in the constraining means 28. An idler wheel 34 is provided for positioning the band adjacent to the feed conveyor 23. The idler wheel 34 is freely rotatably mounted in the housing 20 adjacent to the upper feed belt 25 and the band 30 travels across the idler wheel 34 as it winds and unwinds.

The first end 36 is fixed in the housing 20 adjacent to the lower feed belt 26 so that the fixed end 36 and the idler wheel 34 form a gate 38 at the end of the feed conveyor 23 to the ensure that plugs delivered by the feed conveyor 23 are captured by the band 30. Once the loading process is completed, plugs are restrained in the band 30 by the feed conveyor 23, which will only allow plugs to pass when the belts 24, 25 are moving. During unloading of the plugs, the gate 38 ensures that plugs exit the band 30 at the feed conveyor 23.

As the filter plugs 5 are conveyed into the housing 20 by the feed conveyor 23, the filter plugs press against the band 30. The increasing load of filter plugs 5 causes the band 30 to unwind from the reel 32, thus expanding the constraining means 28 and adjusting the internal space of the housing 20. The winding tension on the reel 32 is selected so that the band 30 provides sufficient contact pressure to maintain the filter plugs 5 in a bundle-like manner, but not compress or deform the filter plugs 5 or hinder the transport of additional plugs into the constraining means 28.

An agitator 40 is provided to assist in packing the plugs tightly in the band 30 as they are loaded, thus more easily maintaining the plugs in parallel alignment. Vibration from the agitator 40 prevents the filter plugs 5 from clumping, which can hinder the flow of filter plugs into the band 30 or create a jam at the feed belts. In addition, by keeping the plugs tightly packed, the agitator 40 prevents plugs from twisting out of alignment into open spaces or gaps in the bundle of plugs. This problem is particularly evident when handling narrow profile filter plugs, which because of thinness and light weight, can easily slip in gaps between other plugs and twist or turn 90° out of orientation with the container. As the plugs are unloaded the agitator assists in moving the plugs smoothly from the band 30 to the conveyor 23. In a preferred embodiment of the invention, the agitator 40 comprises a plate 42 positioned at the bottom of the housing 20 and coupled to an oscillator 44. The oscillator 44 may be a conventional oscillating device or more preferably a vibrator. The oscillator 44 imparts motion to cause the plate 42 to oscillate in the direction shown by arrows 46, and the plate 42 impinges on the expanded band 30 to oscillate the band and its contents.

At least one sensing means 48 for sensing the volume of the expandable constraining means 28 is provided. The sensing means 48 senses the position of the expandable constraining means 28 in the housing 20 and the position information is used to determine the volume of the constraining means 28. In a preferred embodiment of the present invention, the sensing means 48 comprises a switch mounted in the interior of the housing 20. FIG. 1 shows three switches 48, which are electrically connected to a control interface 50 integrated with the tray 10. The control interface 50 communicates with the external drive means to stop the conveyor 23. In this embodiment, the switches 48 are preferably mechanical switches that respond to contact with the band 30, but may also be light emitters and detectors, photo cells or other suitable types of switches that can detect the position of the band within the housing 10.

A jam sensor 52 for detecting obstructions in the feeding operation is provided. The jam sensor 52 monitors the feed conveyor 23 and if an obstruction is detected, for example, a filter plug jammed in the feed conveyor or the failure of any filter plugs to pass through the feed conveyor when expected, the jam sensor signals a control means, described below, to stop the loading or unloading operation. The jam sensor 52 is preferably a light emitter and detector or a photo cell device disposed to monitor the space between the feed belts 24, 25 and the gate 38 and is connected with the control interface 50.

A control interface 50 operationally links the tray 10 with the external loading and unloading stations. The control interface 50 receives information from the various sensing means in the tray 10 and communicates the information to an external control means for controlling the loading and unloading processes. In a preferred embodiment, the control interface 50 is connected with external control unit 76 (shown in FIG. 3) when the tray 10 docks at a station. Signals from the station and the tray switches 48 are processed by the control unit 76 which regulates the mechanical and electrical systems in the tray 10. In determining, for example, the volume of filter plugs in the band 30, a signal from all three of the switches 48 indicating contact with the band 30 will indicate that the tray 10 is full. After this information is communicated, the control unit 76 would then stop the feed conveyor 23. The operation of the control unit 76 is more fully described below.

A tray identification means 54 is provided for identifying the particular batch of filter plugs being loaded by recording and displaying information such as brand or type, identification of the plug maker and plug station, number of plugs in the tray, date and time the filter plugs were loaded, and other pertinent information. The information is provided to the identification means from the loading station. The identification means 54 is preferably a memory device such as a read/write memory chip that is programmed with the information at the loading station and from which the information can be readily retrieved at an unloading station. The identification means 54 is preferably equipped with a radio frequency receiver and transmitter to communicate with the loading and unloading stations to avoid the necessity of making a physical connection when the tray 10 is docked at a station. At the unloading station, the information identifying the filter plugs is read from the identification means 54 and the chip is erased. Unloading information, including the time and place of unloading and the brand or type of filters unloaded, is written on the identification means 54 for quality control and tracking purposes.

In order to better describe the operation of the filter plug tray 10, the interaction between the tray 10 and loading and unloading stations will be described. FIG. 3 is a side elevational view of the tray 10 at a loading station 60. The loading station 60 includes a conveyor 62 which transports the filter plugs in bulk flow 64 from a manufacturing unit (not shown) and a stackformer 65 which takes the flow 64 of filter plugs from the conveyor 62 and forms a stack 68 for delivery to the tray 10. A load reservoir 66 receives and stores filter plugs from the stack when the conveyor 62 is transporting plugs, but the plugs cannot be loaded onto a tray 10. At the bottom of the filter plug stack 68 is a bulk flow converter wheel 70. As the wheel 70 rotates, flutes 72 in the wheel carry filter plugs individually from the stack 68 to a loading conveyor 74, thus converting the stack to a single layer stream 5 which can be fed into the feed conveyor 23.

In the loading position of the tray 10 (as shown in FIG. 3) the loading port 22 is aligned with the loading conveyor 74 of the filter manufacturing station. The single layer stream 5 of filter plugs is conveyed by the loading conveyor 74 to the loading port 22 and into the feed conveyor 23.

With the tray 10 in loading position as shown in FIG. 3, the feed conveyor coupling 27 is connected to an external drive means driven by the loading conveyor 74. The control interface 50 is connected to the control unit 76. The control unit 76 provides electrical power through the control interface 50 to operate the agitator 40 and the sensor switches 48. The control unit 76 also controls the loading station conveyor 74 and sets the speed at which the loading conveyor 74 and feed conveyor 23 run according to the amount of filter plugs available for loading. For example, when the tray 10 is first docked at the loading station 60, the reservoir 66 may contain an overflow quantity of filter plugs which were stored there when no tray was docked at the loading station. In this situation, the control unit 76 operates the loading conveyor 74 and the feed conveyor 23 at a sufficiently high rate to load plugs from both the reservoir 66 and the stack 68 until the reservoir is depleted. The load rate will then be decreased to match the stack 68 flow rate.

The identification means 54 is coupled with a tray identifier 78 that writes pertinent information about the filter plugs being loaded onto the tray 10, as described above.

Figure 4:
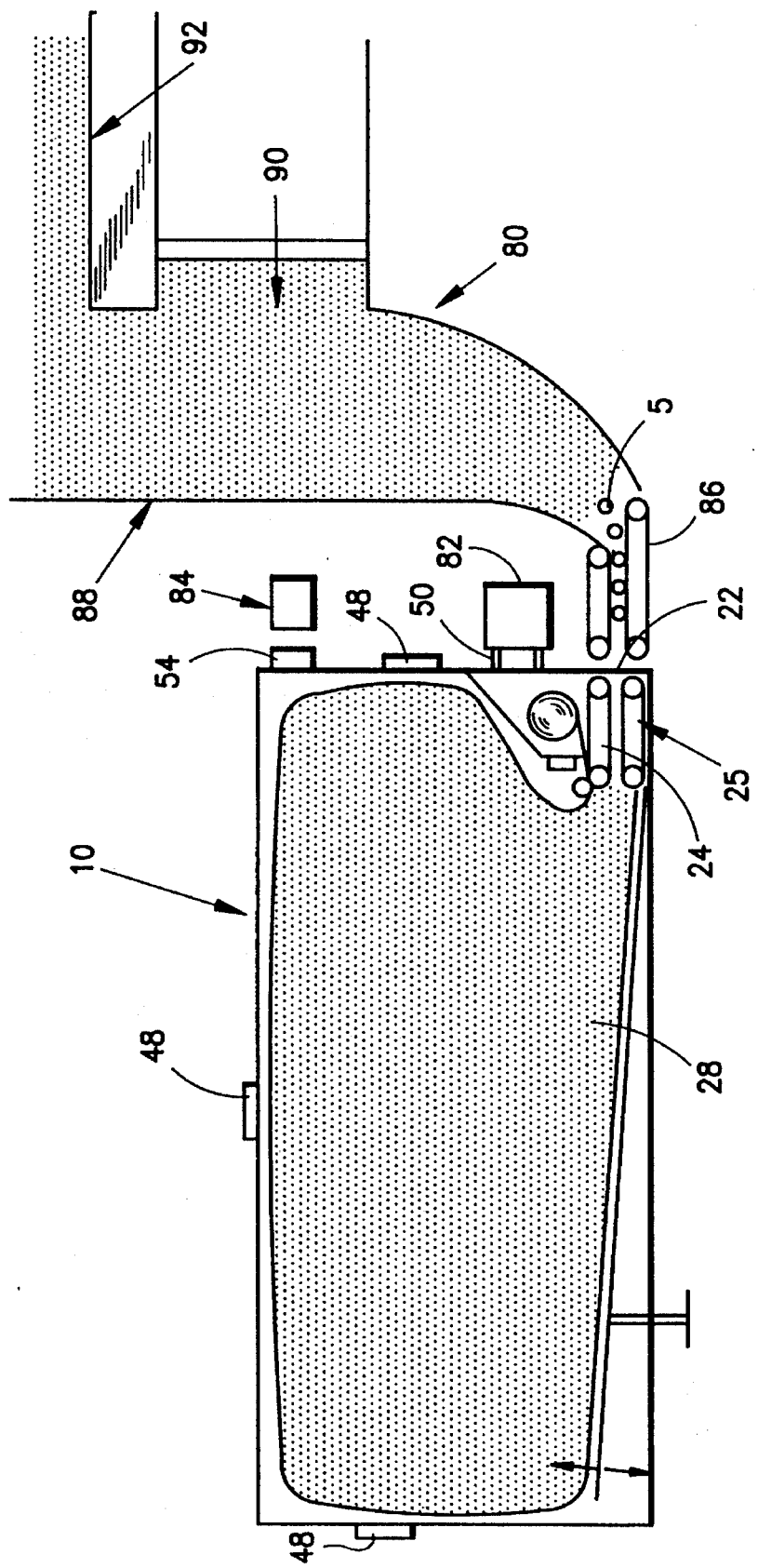
FIG. 4 is a side elevational view of the filter plug tray engaged at a plug unloading station.

In the unloading process as shown in FIG. 4, the loaded tray 10 is engaged at a filter plug unloading station 80. As can be seen in FIG. 4, the plug constraining means 28 is full and is activating each of the sensor switches 48. The control interface 50 is coupled to an unload control unit 82, which signals to the feed conveyor 23 to convey filter plugs out of the tray 10. An identification reader 84 at the unloading station 80 interfaces with the identification means 54 for reading the information about the tray contents which was written on the chip at the loading station 60.

The loading port 22 of the tray 10 is positioned at the unloading station 80 to deliver filter plugs across the loading port 22 to an unload conveyor 86. The tension in the band 30 urges the filter plugs to the feed conveyor 23 in the correct orientation to be readily taken up by the conveyor. The feed conveyor 23 then transports the plugs to the unloading conveyor 86. The unload conveyor 86 takes the single layer stream 5 of filter plugs from the tray 10 and delivers it to a stackformer 88, which forms a stack of filter plugs 90. The stack 90 rises to a conveyor 92 which carries the filter plugs to a cigarette manufacturing station (not shown) where the plugs are attached to cigarettes or other filtered smoking products.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments without departing from the scope of the present invention as defined by the following claims.

What is claimed is:

1. A method for loading and unloading a filter plug tray, comprising the steps of:

feeding filter plugs into a tray housing from a loading station;

receiving the filter plugs in the housing in an opening defined by an expandable constraining means;

adjusting the expandable constraining means non-linearly to match the volume of filter plugs;

applying pressure around the plugs to maintain the plugs in a predetermined orientation;

transporting the tray housing from the loading station to an unloading station: and unloading the plugs in the predetermined orientation via the opening of the expandable constraining means from the expandable constraining means to the unloading station.

2. The method as claimed in claim 1, further comprising feeding the filter plugs into the housing in a single layer.

3. The method as claimed in claim 1, further comprising the step of agitating the filter plugs in the housing to facilitate tightly packing them in the housing.

4. The method as claimed in claim 1, wherein said step of applying pressure comprises tensioning the expandable constraining means.

5. The method as claimed in claim 1, wherein said adjusting step occurs throughout said receiving step.

6. The method as claimed in claim 1, wherein said pressure applying step occurs throughout said receiving step.

7. The method as claimed in claim 1, wherein said unloading step comprises reducing the expandable constraining means to urge the filter plugs through the opening of the expandable constraining means.

8. A tray for filter plugs, comprising:

a housing, wherein the housing includes a port adapted for selective connection with a loading station and an unloading station;

plug feeding means for feeding filter plugs into and out of the housing via the port;

expandable constraining means for receiving filter plugs within the housing via a defined opening;

the expandable constraining means non-linearly adjusting an interior space of the housing to accommodate the filter plugs;

the expandable constraining means applying pressure to the filter plugs to constrain the filter plugs in a predetermined orientation; and the expandable constraining means contracting to urge the filter plugs out of the defined opening.

9. The tray as claimed in claim 8, wherein the plug feeding means comprises a feed conveyor disposed in the housing for conveying plugs across a housing loading port.

10. The tray as claimed in claim 9, wherein the feed conveyor includes a pair of spaced, parallel conveyor belts for conveying plugs in a single layer.

11. The tray as claimed in claim 10, wherein the conveyor belts include a coupling to transmit drive power from an external drive source.

12. The tray as claimed in claim 8, wherein the expandable constraining means comprises a flexible band having a first end fixed in the housing and a second end wound on a reel rotatably mounted in the housing, the reel being under tension for winding the band.

13. The tray as claimed in claim 12, wherein the reel rotates to expand the band to receive filter plugs loaded into the tray and to contract as filter plugs are unloaded from the tray.

14. The tray as claimed in claim 12, wherein the flexible band is formed from one of a fabric and polyester material.

15. The tray as claimed in claim 12, further comprising an agitator mounted in the housing and impinging on the flexible band.

16. The tray as claimed in claim 15, wherein the agitator comprises a plate located at the bottom of the housing and connected to a vibrator.

17. The tray as claimed in claim 8, further comprising an agitating means for agitating the plugs to facilitate tightly packing the plugs in the tray.

18. The tray as claimed in claim 8, further comprising a control interface for communicating with an external control associated with a loading or unloading station.

19. The tray as claimed in claim 8, wherein the housing is readily transportable.

20. The tray as claimed in claim 8, further comprising a jam sensor located in the housing for sensing a jam in the feeding means.

21. The tray as claimed in claim 20, wherein the jam sensor communicates with a control interface to stop the feeding means.

22. The tray as claimed in claim 20, wherein the jam sensor comprises a light emitter and detector arranged across the feeding means.

23. The tray as claimed in claim 8, further comprising a sensor which senses the volume of the constraining means and communicates with a control interface.

24. The tray as claimed in claim 23, wherein the sensor includes at least one switch mounted in the housing which responds to contact with the constraining means.

25. The tray as claimed in claim 8, further comprising identification means for recording and displaying information which identifies a particular batch of filter plugs being loaded in the tray.

26. A tray for filter plugs, comprising:

a housing having a port for loading and unloading filter plugs therethrough, wherein the port is adapted for selective connection with a loading station and unloading station; and expandable plug constrainer which non-linearly adjusts an internal space in the housing comprising:

a flexible band having a first end fixed in the housing;

a reel rotatably mounted the housing on which a second end of the flexible band is wound, the band defining a receptacle for filter plugs; and the reel and the first end forming an opening open to the port, the reel unwinding and winding the band to respectively expand and contract the defined receptacle to respectively load and unload filter plugs via the opening, wherein the reel has a winding tension to urge the band to wind on the reel, wherein containment pressure is applied to plugs within the receptacle defined by the band.

27. The tray as claimed in claim 26, further comprising a feed conveyor for conveying filter plugs across the loading port to and from the opening.

28. The tray as claimed in claim 26, further comprising a sensor which senses the volume of the receptacle defined by the flexible band.

29. The tray as claimed in claim 26, further comprising an agitator which impinges on the band and agitates the plugs.

* * * * *